(12) United States Patent
Hirata

(10) Patent No.: US 6,467,838 B2
(45) Date of Patent: Oct. 22, 2002

(54) TILT AND SLIDE ROOF DEVICE

(75) Inventor: Tetsuya Hirata, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/865,623

(22) Filed: May 29, 2001

(65) Prior Publication Data

US 2001/0048233 A1 Dec. 6, 2001

(30) Foreign Application Priority Data

May 30, 2000 (JP) ........................................ 2000-161278

(51) Int. Cl.7 .................................................... B60J 7/05
(52) U.S. Cl. ........................................ 296/221; 296/224
(58) Field of Search ................................. 296/221, 224

(56) References Cited

U.S. PATENT DOCUMENTS

| 5,085,622 A | * | 2/1992 | Kohlpaintner et al. .. 296/221 X |
| 5,259,662 A | * | 11/1993 | Huyer ........................ 296/221 |
| 5,527,085 A | * | 6/1996 | Ochiai et al. ............ 296/221 X |
| 5,580,123 A | | 12/1996 | Ochiai |
| 6,290,289 B1 | * | 9/2001 | Ohtsu et al. ................ 296/221 |

FOREIGN PATENT DOCUMENTS

JP 7-101247 4/1995

* cited by examiner

Primary Examiner—Dennis H. Pedder
(74) Attorney, Agent, or Firm—Burns, Doane, Swecker & Mathis, LLP

(57) ABSTRACT

To restrict the sliding movement of the movable panel having first and second ends during the up and down movement of the second end of the panel, a tilting and sliding roof device for a vehicle includes a pair of stopper blocks fixed to a pair of guide rails, with each stopper block being provided with a pair of first and second elongated grooves extending in the up and down moving direction of the movable panel. A pair of first engaging members is provided on the movable panel for engagement with and disengagement from the first elongated grooves of the stopper blocks, and a pair of second engaging members is provided on the movable panel for engagement with and disengagement from the second elongated grooves of the stopper blocks.

20 Claims, 10 Drawing Sheets

TILT AND SLIDE ROOF DEVICE

This application is based on and claims priority under 35 U.S.C. §119 with respect to Japanese Application 2000-161278, filed on May 30, 2000, the entire content of which is incorporated herein by reference.

FIELD OF THE INVENTION

This invention generally relates to a movable sun roof on a vehicle. More particularly, the present invention pertains to a tilt and slide roof device (sun roof) for opening and closing an opening portion provided on the roof panel of a vehicle.

BACKGROUND OF THE INVENTION

A known tilting and sliding roof device is disclosed in Japanese Patent Application published in 1995 as Toku Kai Hei 7-101247. The tilting and sliding roof device is provided with a movable panel for opening and closing an opening formed on the roof panel of the vehicle, a pair of guide rails arranged along the peripheral side edges of the opening portion, shoe members slidably guided by the guide rails and supporting one end of the movable panel, and a driving lift link rotatably and slidably guided in the guide rails for moving the other end of the movable panel up and down in a manner centered around one end of the movable panel.

In this known tilting and sliding roof device, a check block connected with the shoe members engages a notch formed in the guide rails to restrict the sliding movement of the shoe members while the other end of the movable panel is moving up and down. Typically, with respect to the engagement between the notch and the check block, gaps are provided in the sliding direction of the shoe members to take into account possible jamming of the check block. However, the gaps may sometimes cause excessive play in the sliding direction of the movable panel. During the up and down movement of the other end of the movable panel, the movable panel might slide in the sliding direction by virtue of the excessive play associated with the gaps. Because the other end of the movable panel is not stable as a result of excess sliding movement, a sealing member located between the movable panel and the roof panel can become damaged.

A need thus exists for a tilting and sliding sun roof device that is able to effectively restrict sliding movement of the movable panel without excessively damaging the sealing member.

SUMMARY OF THE INVENTION

According to one aspect of the present invention, a tilt and slide roof device includes a roof panel fixed to a vehicle body, an opening portion formed on the roof panel, a movable panel for opening and closing the opening portion, a pair of guide rails arranged along the peripheral side edges of the opening portion for movably guiding the movable panel, a pair of front shoes slidably guided in the guide rails and supporting a first end of the movable panel, and a pair of rear shoes slidably guided on the guide rails and supporting the second end of the movable panel. A pair of driving lift links is rotatably and slidably guided by the guide rails to move the other end of the movable panel up and down centering around the first end of the movable panel, with the opening portion being switched from a closed condition to a tilt-open condition by upward movement of the second end of the movable panel, and being switched from the closed position to a slide open condition by downward movement of the second end of the movable panel. A stopper block is fixed to each of the guide rails and includes first and second elongated grooves extending in the up and down movement direction of the movable panel. A pair of first engaging members is provided on the movable panel for engagement with and disengagement from the first elongated grooves of the stopper blocks, with slidable movement of the front shoes being restricted by engagement of the first engaging members with the first elongated grooves while the second end of the movable panel is moving downward. A pair of second engaging members is provided on the movable panel for engagement with and disengagement from the second elongated grooves of the stopper blocks, with slidable movement of the front shoes being restricted by engagement of the second engaging members with the second elongated grooves while the second end of the movable panel is moving upward.

The sliding movement of the front shoes is restricted by the engagement between the first elongated grooves and the first engaging members, and the engagement between the second elongated grooves and the second engaging members. This construction allows the gap provided in known devices to be minimized. Thus, the sliding restriction of the movable panel can be better ensured during the up and down movement of the second end of the movable panel.

According to another aspect of the invention, a tilt and slide sun roof device for a vehicle includes a vehicle roof panel, an opening portion formed in the roof panel, a pair of guide rails arranged along peripheral sides of the opening portion, a movable panel for opening and closing the opening portion, a pair of slidably movable front shoes each guided in one of the guide rails and supporting a first end of the movable panel, a pair of slidably movable rear shoes each guided in one of the guide rails and supporting a second end of the movable panel that is opposite the first end of the movable panel, and a pair of driving lift links each connected to the movable panel and the front and rear shoes to move the second end of the movable panel up and down centering around the first end of the movable panel. The opening portion is switched from a closed condition to a tilt-open condition by upward movement of the second end of the movable panel, and is switched from the closed position to a slide open condition by downward movement of the second end of the movable panel. A pair of stopper blocks is also provided and each of the stopper blocks includes a groove extending in the up and down movement direction of the movable panel. Each engaging member of a pair of engaging members is engageable with and disengageable from the groove of one of the stopper blocks, with slidable movement of the front shoes being restricted by engagement of the engaging members with the grooves while the second end of the movable panel is moving downward.

In accordance with a further aspect of the invention, a tilt and slide sun roof device for a vehicle includes a vehicle roof panel, an opening portion formed in the roof panel, a pair of guide rails arranged along peripheral sides of the opening portion, a movable panel for opening and closing the opening portion, a pair of slidably movable front shoes each guided in one of the guide rails and supporting a first end of the movable panel, a pair of slidably movable rear shoes each guided in one of the guide rails and supporting a second end of the movable panel that is opposite the first end of the movable panel, and a pair of driving lift links each connected to the movable panel and the front and rear shoes to move the second end of the movable panel up and down centering around the first end of the movable panel. The opening portion is switched from a closed condition to a tilt-open condition by upward movement of the second end of the movable panel, and is switched from the closed position to a slide open condition by downward movement of the second end of the movable panel. A pair of stopper blocks is provided, with each stopper block including a groove extending in an up and down movement direction of the movable panel. A pair of engaging members is also provided, with each engaging member engaging with and disengaging from the groove of one of the stopper blocks, and with slidable movement of the front shoes being restricted by engagement of the engaging members with the grooves while the second end of the movable panel is moving upward.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 4:
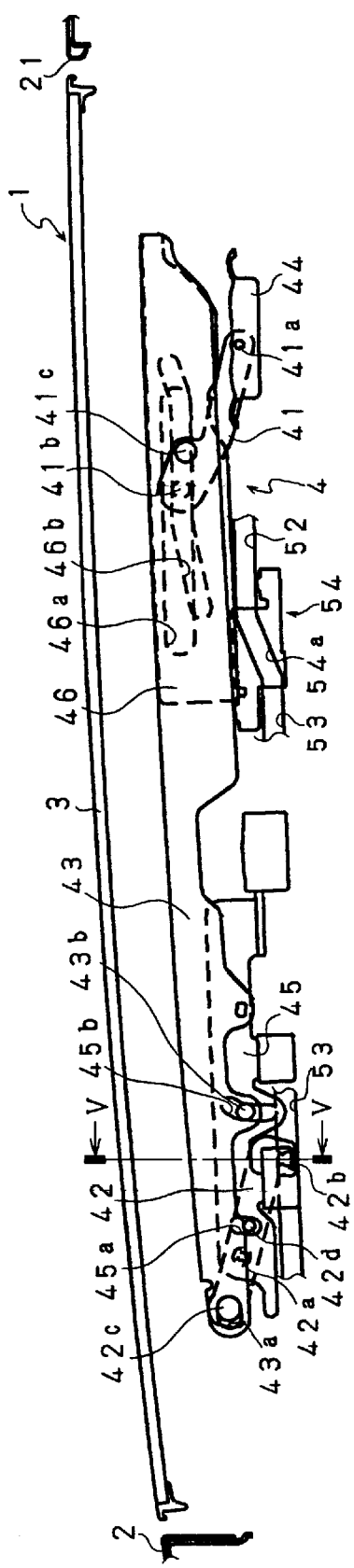
FIG. 4 is a side view of the tilt and slide roof device of the present invention when the moving panel is in the fully closed position.
Figure 5:
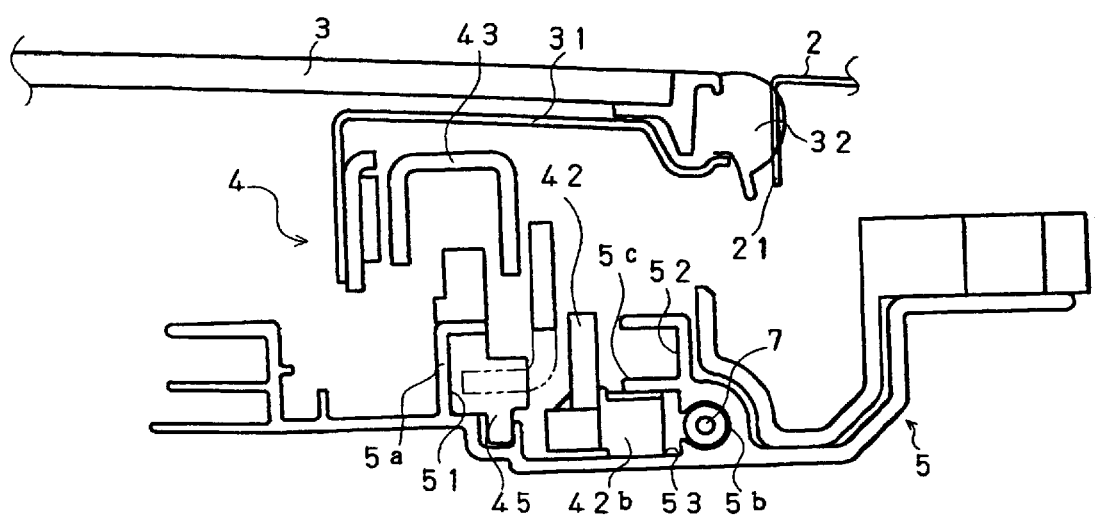
FIG. 5 is a cross sectional view taken along the section line V—V in FIG. 4.

Referring initially to, for example, FIGS. 4 and 5, the tiltable and slidable roof device 1 of the present invention, serving as a sun roof device, includes a movable panel 3 for opening and closing an opening portion 21 formed on a roof panel 2 of a vehicle. The roof device also includes a pair of link mechanisms 4 for operating the movable panel 3, and a pair of guide rails 5 for guiding the movement of the movable panel 3.

Figure 2:
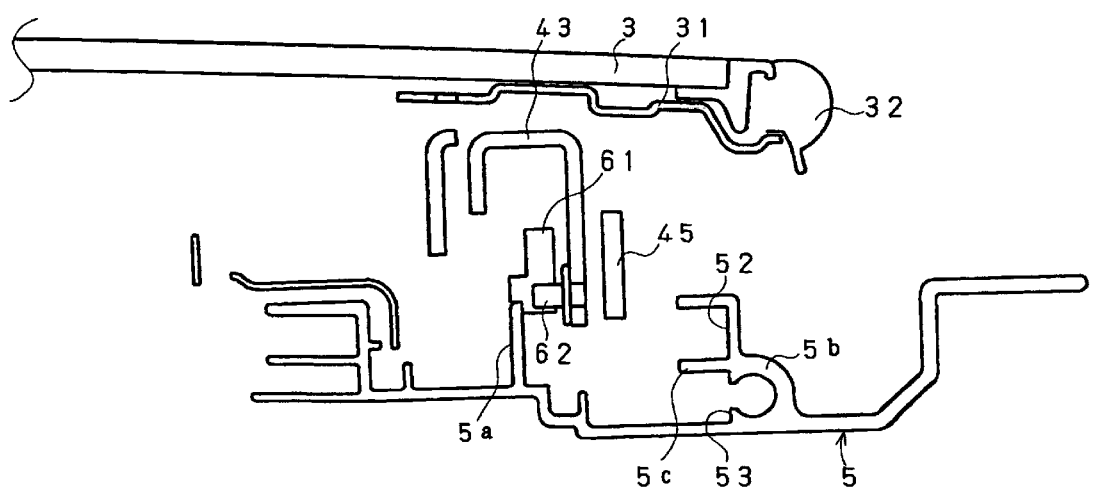
FIG. 2 is a cross-sectional view of the roof device taken along the section line II—II in FIG. 1.

The pair of guide rails 5 are arranged at opposite sides of the opening portion 21 with respect to the width-wise direction of the vehicle (i.e., the right to left direction in FIG. 2) and are fixed to the vehicle roof panel 2. The guide rails 5 thus extend along the peripheral side edges of the opening portion 21 in the longitudinal direction of the vehicle (i.e., the right to left direction in FIG. 4). The guide rails 5 are elongated, generally bar-shaped members having an approximately U-shaped cross-section as shown in FIG. 2. In cross-section, each of the guide rails 5 includes a pair of generally upright or vertical walls 5a, 5b spaced apart at a fixed interval or distance.

A first one of the vertical walls 5a is provided with a shoe groove 51 which is generally C-shaped in cross-section as shown in FIG. 5 and opens toward the other vertical wall (second vertical wall) 5b which extends in the lengthwise direction of the rail. The second vertical wall 5b is provided with upper and lower guide grooves 52, 53 which possess an inverse generally C-shaped cross-section. The upper and lower guide grooves 52, 53 open toward the first vertical wall 5a that extends in the lengthwise direction of the rail. The upper and lower guide grooves 52, 53 are positioned adjacent to one another, with the upper guide groove 52 being positioned above the lower guide groove 53 and with a side wall 5c positioned between the two guide grooves 52, 53. The upper and lower guide grooves 52, 53 are connected through a transition guide groove or transfer guide groove 54a of a guide piece 54 fixed that is fixed to the guide rail 5 as shown in FIG. 4.

A rear shoe 44 is supported in the lower guide groove 53 and the shoe groove 51 of the guide rail 5, and is slidable in the lengthwise direction of the rail. The rear shoe 44 is positioned rearwardly of the guide piece 54 as shown in FIG. 4.

A front shoe 45 is supported in the shoe groove 51 of the guide rail 5 and is slidable in the lengthwise direction of the rail. The front shoe 45 is positioned forwardly of the rear shoe 44 as shown in FIG. 4.

The pair of link mechanisms 4 each include a rear lift link 41, a front lift link 42, and a movable bracket link 43. The movable bracket link 43 is fixed to the peripheral side edge of the movable panel 3 in the lateral direction of the vehicle through a reverse or up-side down L-shaped bracket 31. A cam piece 46 is fixed to the rear end of the movable bracket link 43 with respect to the longitudinal direction of the vehicle. The cam piece 46 is provided with cam grooves 46a, 46b extending generally in the lengthwise direction of the vehicle. The cam grooves 46a, 46b, which can be formed in spaced apart walls of the cam piece, are spaced apart from one another in the lateral direction of the vehicle. An elongated hole 43a is formed in the front end of the movable bracket link 43 in the longitudinal direction of the vehicle.

One end (i.e., a first end) of the rear lift link 41 is rotatably supported at the rear shoe 44 by way of a pin 41a. The other end (i.e., the second end) of the rear lift link 41 is positioned between the cam grooves 46a, 46b of the cam piece 46 formed at the rear end of the movable bracket link 43. The second end of the rear lift link 41 is slidably guided in the cam grooves 46a, 46b by way of pins 41b, 41c. The pins 41b, 41c extend laterally in opposite directions from the rear lift link 41, with one pin 41b being positioned in and guided by one cam groove 46a and the other pin 41c being positioned in and guided by the other cam groove 46b.

The front lift link 42 is rotatably supported at the front shoe 45 by a pin 42a at an intermediate portion of the front link, approximately at the middle of the front lift link 42 in the lengthwise direction. One end (i.e., a first end) of the front lift link 42 is positioned in the lower guide groove 53 at the front portion of the guide piece 54 in the longitudinal direction of the vehicle, and is slidably guided in the lengthwise direction of the rail by a pin 42b. The other end (i.e., the second end) of the front lift link 42 is slidably supported by a pin 42c at the elongated hole 43a at the front end of the movable bracket link 43 with respect to the longitudinal direction of the vehicle. Further, a pin 42*d* is provided next to the pin 42*a* in the front lift link 42. An arc-shaped hole 45*a* centering around the pin 42*a* is formed in the front shoe 45. The pin 42*d* is inserted into the elongated hole 45*a* for guiding the rotating movement of the front lift link 42.

The rear shoe 44 is connected to a conventional driving mechanism such as a motor through a cable 7 that is guided by the guide rail 5. A panel restriction mechanism 6, the details of which are described below in more detail, is disposed between the movable panel 3 and the front shoe 45. The restriction mechanism 6 is adapted to alternatively restrict and permit sliding movement of the front shoe 45 corresponding to the tilt-down and the tilt-up movement of the movable panel 3 which are also explained in more detail below.

The operation and movement of the tilt and slide sun roof device of the present invention is as follows. Referring initially to FIG. 4, the opening portion 21 of the roof panel 2 is closed by the movable panel 3. The pins 41*b*, 41*c* of the rear lift link 41 are positioned in the middle of the cam grooves 46*a*, 46*b* of the cam piece 46 with respect to the lengthwise direction. The pin 42*b* of the front lift link 42 is guided by the lower guide groove 53 of the guide rail 5.

Figure 6:
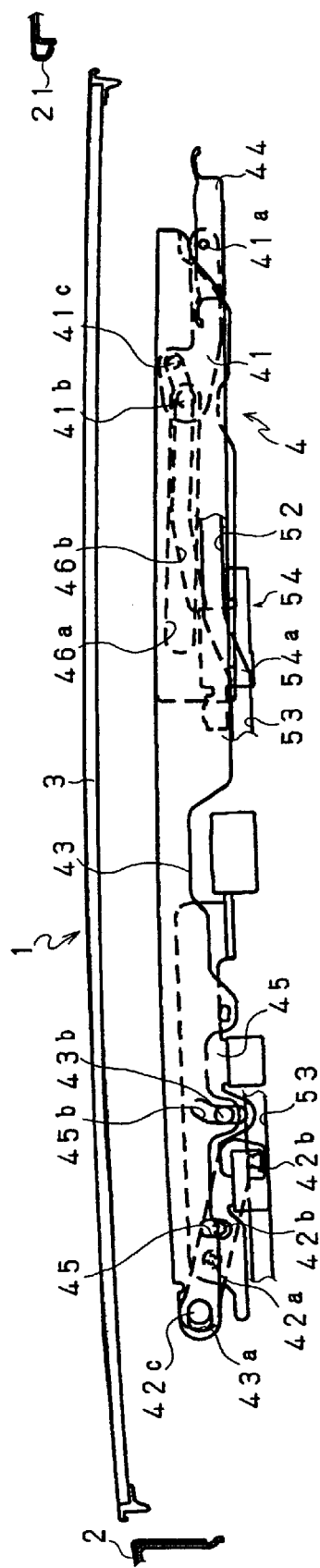
FIG. 6 is a side view of the tilt and slide roof device of the present invention similar to FIG. 4, but illustrating the roof device after movement.

When the rear shoe 44 is slidably moved towards the rearward direction of the rail by the driving mechanism, the rear lift link 41 moves towards the rear with the rear shoe 44. In this situation, because the sliding movement of the front shoe 45 is restricted by the restriction mechanism 6, the movable bracket link 43 is restricted from slidably moving in the longitudinal direction of the vehicle. By virtue of the movement of the rear lift link 41 towards the rear, the pins 41*b*, 41*c* of the rear lift link 41 are slidably guided in the rearward direction within the cam grooves 46*a*, 46*b* of the cam piece 45. Accordingly, the rear lift link 41 rotates in the counter-clockwise direction in FIG. 4 centering around the pin 41*a* by the cam function associated with the cam grooves 46*a*, 46*b*. As a result, the movable bracket link 43 rotates in the clockwise direction in FIG. 4 centering around the pin 42*c*. As shown in FIG. 6, the rear end portion of the movable panel 3 thus tilts downward in an inclined manner so that the movable panel 3 assumes an inclined position.

In the tilt-down condition shown in FIG. 6, when the rear shoe 44 is further slidably moved toward the rearward direction, the sliding movement of the front shoe 45 is permitted by the restriction mechanism 6, and so the movable bracket link 43 is able to move in the longitudinal direction of the vehicle. Then, the rear lift link 41, the movable bracket link 43, and the front lift link 42 slidably move toward the rear. The movable panel 3 thus moves toward the rearward direction while maintaining its inclined position shown in FIG. 6, and so the opening portion 21 in the vehicle roof panel 2 begins to open or become uncovered.

Figure 7:
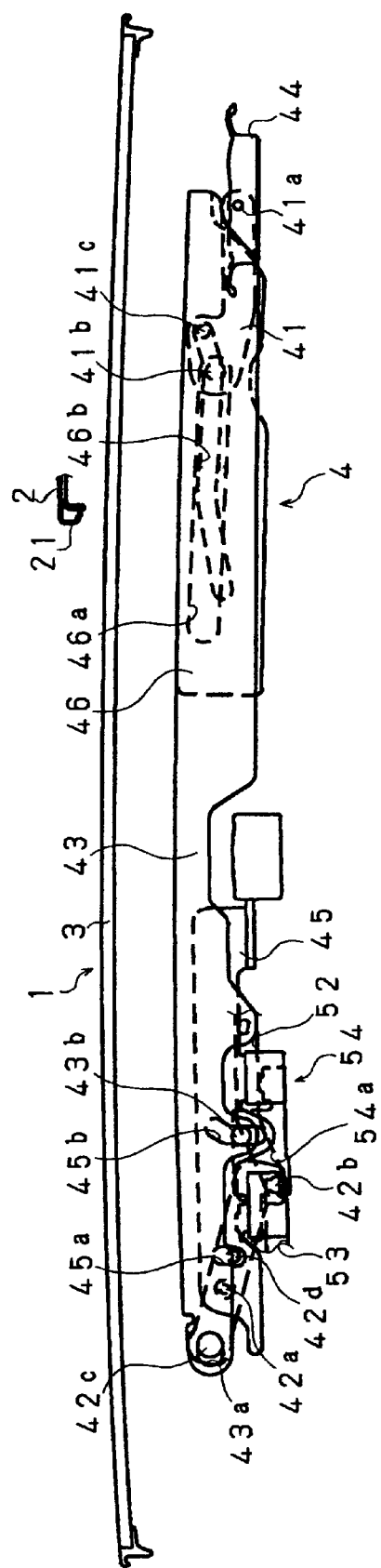
FIG. 7 is a side view similar to FIG. 6, but showing the tilt and slide roof device after further movement.
Figure 8:
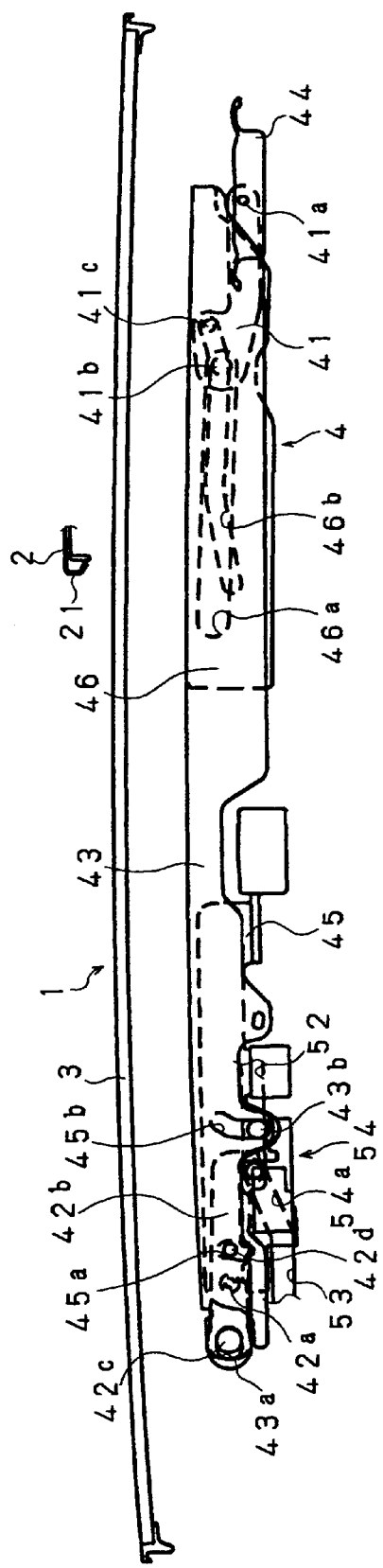
FIG. 8 is a side view similar to FIG. 7, but illustrating the tilt and slide roof device after further movement.

As the movable panel 3 moves toward the rear, the pin 42*b* connected to the front lift link 42 is slidably guided into the upper guide groove 52 from the lower guide groove 53 through the transition guide groove 54*a* of the guide piece 54. Accordingly, by virtue of the shape of the transition guide groove 54*a* as shown in FIGS. 7 and 8, the front lift link 42 rotates in the counter-clockwise direction in FIGS. 7, 8 centering around the 42*b*. As a result, the front end portion of the movable panel 3 tilts downward so that the movable panel is in a generally flat or horizontal position. When the movable panel 3 further moves toward the rear, as shown in FIG. 9, the movable panel eventually reaches the fully open position in which the opening portion 21 of the roof panel 2 is fully opened or uncovered (i.e., the fully open condition of the opening portion).

Figure 9:
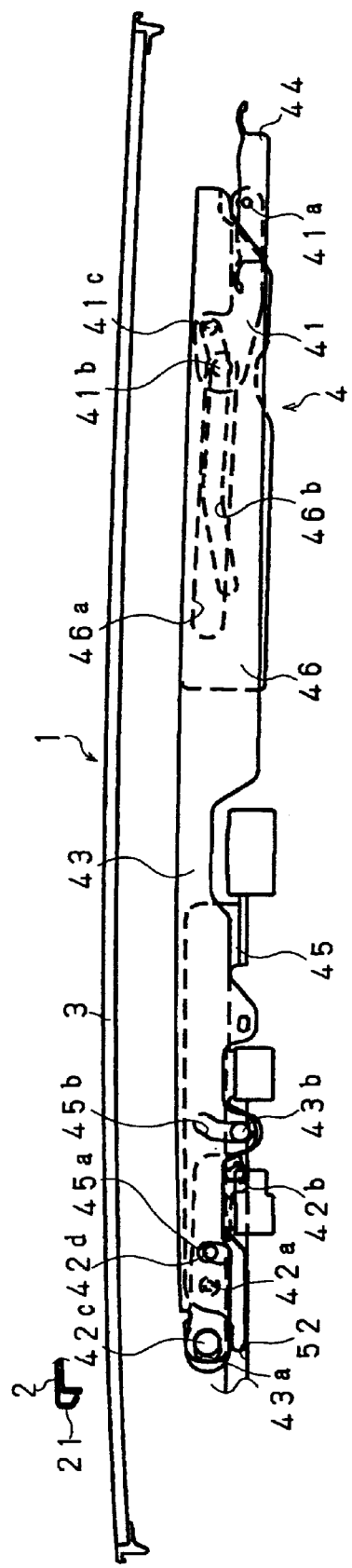
FIG. 9 is a side view similar to FIG. 8, but illustrating the tilt and slide roof device with the movable panel adjacent the fully open position.

In the condition shown in FIG. 9, when the rear shoe 44 is slidably moved by the driving mechanism in the forward direction with respect to the lengthwise direction of the rail, the rear lift link 41, the front lift link 42 and the movable bracket link 43 move and rotate in a manner reverse to and with the same timing as the movement explained above. The movable panel 3 thus moves from the fully open position shown in FIG. 9 to the fully closed position shown in FIG. 4 so that the opening portion 21 in the roof panel is once again closed.

Figure 10:
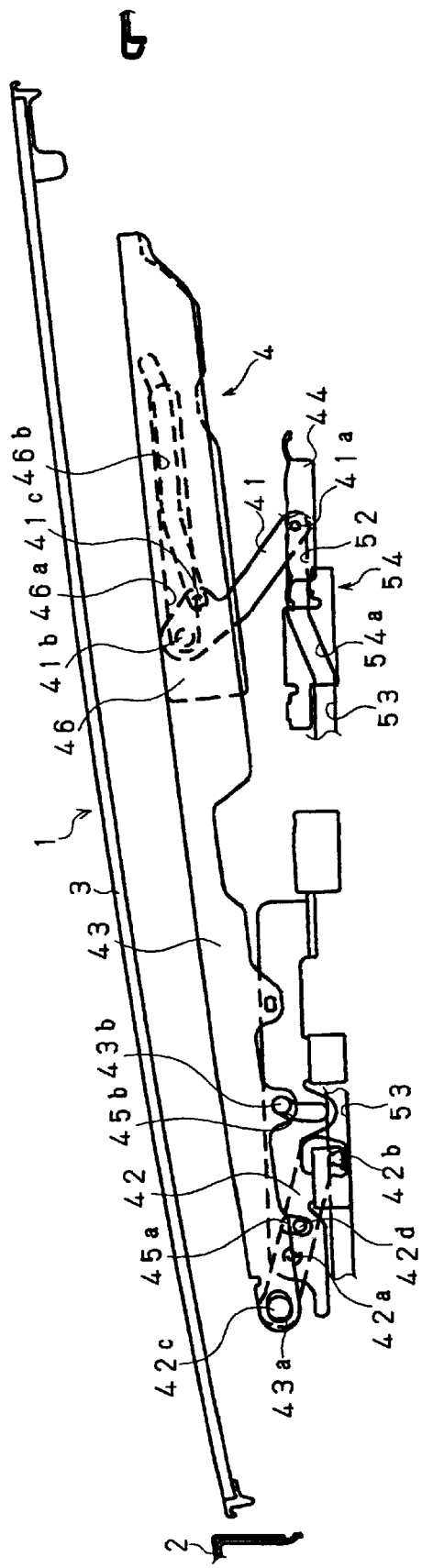
FIG. 10 is a side view of the tilt and slide roof device with the movable panel in the tilt-open position.

With the movable panel 3 in the condition or position shown in FIG. 4, the sliding movement of the rear shoe 44 in the forward direction through operation of the driving mechanism causes the rear lift link 41 to move in the forward direction along with the rear shoe 44. At this time, sliding movement of the front shoe 45 is restricted by the restriction mechanism 6. By virtue of the movement of the rear lift link 41 in the forward direction, the pins 41*b*, 41*c* of the rear lift link 41 are slidably guided toward the front in the cam grooves 46*a*, 46*b* of the cam piece 46. The cam function associated with the cam grooves 46*a*, 46*b* causes the rear lift link 41 to rotate in the clockwise direction as shown in FIG. 10 centering around the 41*a*. As a result, the movable bracket link 43 rotates in the counter-clockwise direction in FIG. 10 centering around the 42*c*. As shown in FIG. 10, the rear end portion of the vehicle of the movable panel 8 thus tilts upward and is disposed in an inclined tilt-up position. Therefore, the tilt-open condition of the opening portion 21 is achieved.

In this manner, when the movable panel 3 is operated from the opening position to the closed position, the rear end of the movable panel 3 is first tilted down then the movable panel 3 is slightly moved rearwardly while maintaining the tilted position. The front end of the movable panel 3 is then lowered to a flat position and finally the movable panel 3 is further moved rearwardly to be positioned beneath the fixed roof position. This operation and movement allows the thickness of the slide roof device 1 (i.e., the height-wise dimension of the slide roof device) to be reduced.

Figure 1:
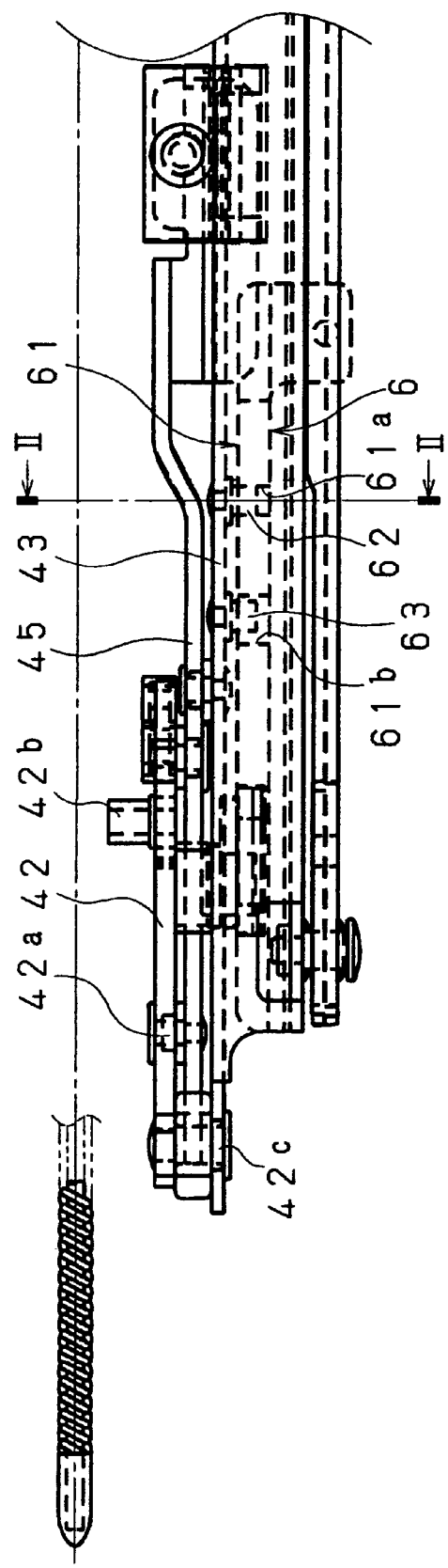
FIG. 1 is a top view of a tilt and slide roof device of the present invention.
Figure 3:
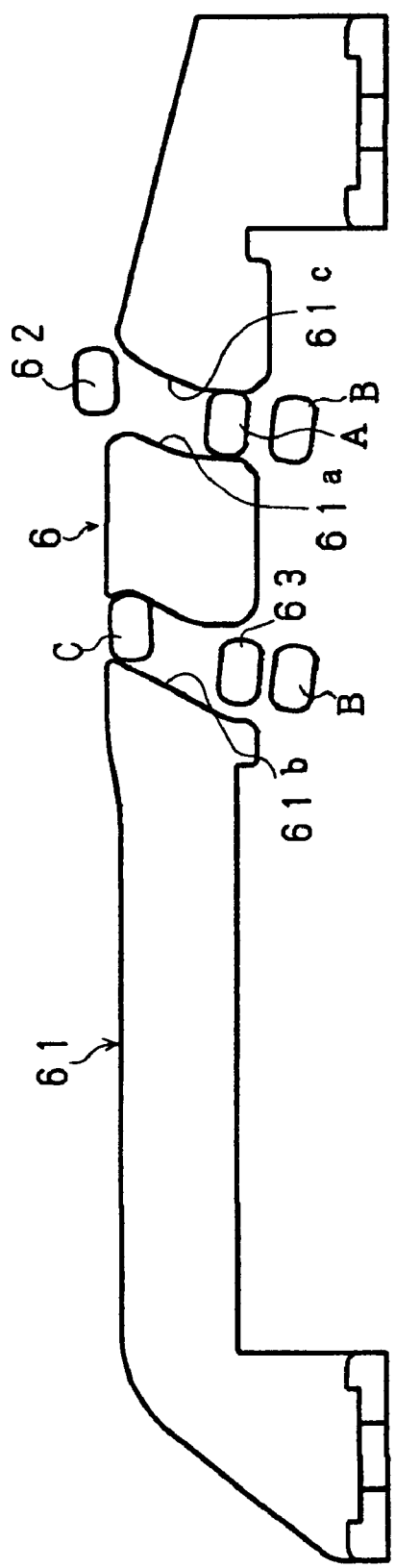
FIG. 3 is a side view of the restricting mechanism forming a control mechanism used in the tilt and slide roof device of the present invention.

The features and operational characteristics associated with the restriction mechanism 6 will now be explained. Referring to FIGS. 1–3, a restriction mechanism 6 is provided on each side, with each restriction mechanism 6 including a stopper block 61, a first engaging pin 62, and a second engaging pin 63. The first and second pins 62, 63 form engaging members. The somewhat elongated bar-shaped stopper block 61 which extends in the lengthwise direction of the rail is arranged on the vertical wall 51 of the guide rail 5 and is secured to the guide rail 5, for example by being screwed to the guide rail 5. The first engaging pin 62 and the second engaging pin 63 are fixed to the movable bracket link 43 and project toward the vertical wall 5*a*. The engaging pins are thus operatively connected to the movable panel 3 so that the engaging pins 62, 63 move with the movable panel 3. The second engaging pin 63 is positioned closer to the rotational center (i.e., the pin 42*c*) of the movable bracket link 43 than the first engaging pin 62.

The stopper block 61 is provided with a first elongated groove 61*a* and a second elongated groove 61*b*. Both ends of the first elongated groove 61*a* and both ends of the second elongated groove 81*b* are open in the vertical direction of the vehicle (i.e., the top and bottom direction in FIG. 3). The first engaging pin 62 is positioned in the first elongated groove 61a, and is engageable with and disengageable from the first groove 61a in response to the rotation of the movable bracket link 43 (i.e., the tilt-down and tilt-up movement of the movable panel 3). The second engaging pin 63 is positioned in the second elongated groove 61b, and is engageable with and disengageable from the second groove 61b in response to the rotation of the movable bracket link 43 (i.e., the tilt-down and tilt-up movement of the movable panel 3).

The first elongated groove 61a and the second elongated groove 61b are opposed to the first engaging pin 62 and the second engaging pin 63 respectively in the lateral direction of the vehicle (i.e., the right and left direction in FIG. 2). The second elongated groove 61b is positioned closer than the first elongated groove 61a to the pin 42c which is the rotational center of the bracket link 43 as shown in FIG. 1. The vertical length or dimension of the first elongated groove 61a is approximately the same as the vertical length or dimension of the second elongated groove 61b. During the tilt-up and tilt-down movement of the movable panel 3, the amount of movement of the second engaging pin 63 in the second elongated groove 61b is smaller than the amount of movement of the first engaging pin 62 in the first elongated groove 61a.

As shown in FIG. 3, the width at the lower portion of the first elongated groove 61a in the longitudinal direction of the vehicle is approximately the same as the width of the first engaging pin 62. The width of the groove 61b gradually increases from a narrower top portion to a wider bottom portion and the width of the groove 61a gradually increases from a narrower bottom portion to a wider top portion.

The first engaging pin 62 is positioned at the lower portion of the first elongated groove 61a when the opening portion 21 is in the closed condition. The wall 61c of the first elongated groove 61a at the rear side of the groove is formed to possess a cam shape and is in contact with the first engaging pin 62 during the tilt-up and tilt-down movement of the movable panel 3 for effecting tilt opening and tilt closing of the opening portion 21.

The width of the upper portion of the second elongated groove 61b in the longitudinal direction of the vehicle is approximately the same as the width of the second engaging pin 63 as also shown in FIG. 3. The second engaging pin 63 is positioned at the upper portion of the second elongated groove 61b in the tilt open condition of the opening portion 21.

During the tilt-up and tilt-down movement of the movable panel 3 for closing and slide opening the opening portion 21, the first engaging pin 62 engages the first elongated groove 61a (i.e., engages the walls of the groove 61a) of the stopper block 61 in the longitudinal direction of the vehicle as shown by the position A in FIG. 3. Accordingly, the movable bracket link 43 is restricted from moving in the longitudinal direction of the vehicle and so sliding movement of the front shoe 45 is restricted. After the tilt-down movement of the movable panel 3 for slide opening is completed, the first engaging pin 62 is disengaged from the first elongated groove 61a of the stopper block and the second engaging pin 63 is disengaged from the second elongated groove 61b of the stopper block 61 as shown by the position B in FIG. 3. Accordingly, the movement of the movable bracket link 43 in the longitudinal direction of the vehicle is permitted, and the sliding movement of the front shoe 45 is also allowed.

During the tilt-up and tilt-down movement of the movable panel 3 for effecting tilt opening of the opening portion 21, the first engaging pin 62 is engaged with the wall 61c of the first elongated groove 61a to define the path of movement of the rear end of the movable panel 3. Accordingly, the deformation of the sealing member 32 of the movable panel 3 illustrated in FIG. 2 is reduced and deterioration of the sealing member 22 is inhibited or prevented. After the tilt-up and tilt-down movement of the movable panel 3 is completed for effecting the tilt-open condition of the opening portion 21, the second engaging pin 63 engages the second elongated groove 61b (i.e., engages the walls of the groove 61b) in the longitudinal direction of the vehicle as shown by the position C in FIG. 3. Accordingly, movement of the movable bracket link 43 in the longitudinal direction of the vehicle is restricted and sliding movement of the front shoe 45 is restricted.

According to the present invention, because the first and second engaging members provided on the movable panel engage the first and second elongated grooves of the stopper block provided at the guide rail, the sliding movement of the shoe members is restricted. With the relatively simple structure associated with the present invention, the restriction of the sliding movement of the movable panel can be ensured during the up and down movement of the other end portion of the movable panel.

In addition, the second elongated groove is positioned closer to the front end of the movable panel than the first elongated groove. The rear end of the movable panel moves up and down centering around the front end of the panel. Because the second elongated groove is engaged with the second engaging member, the sliding movement of the shoe members is restricted under the tilt open condition. As a result, the overall thickness of the device can be reduced and restriction of the sliding movement of the movable panel can be ensured during the up and down movement of the other end portion of the movable panel with a relatively simple construction.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A tilt and slide roof device for a vehicle comprising:

a roof panel fixed to a vehicle body;

an opening portion formed in the roof panel;

a movable panel for opening and closing the opening portion;

a pair of guide rails arranged along peripheral side edges of the opening portion for guiding movement of the movable panel;

a pair of slidably movable front shoes guided in the guide rails and supporting a first end of the movable panel;

a pair of slidably movable rear shoes guided in the guide rails and supporting a second end of the movable panel that is opposite the first end of the movable panel;

a pair of driving lift links rotatably and slidably guided by the guide rails to move the second end of the movable panel up and down centering around the first end of the movable panel, the opening portion being switched from a closed condition to a tilt-open condition by upward movement of the second end of the movable panel, and being switched from the closed condition to a slide open condition by downward movement of the second end of the movable panel;

a pair of stopper blocks each fixed to one of the guide rails, each stopper block including first and second elongated grooves extending in an up and down movement direction of the movable panel;

a pair of first engaging members operatively connected to the movable panel for movement along the first elongated grooves of the stopper blocks, with slidable movement of the front shoes being restricted by virtue of the first engaging members being located in the first elongated grooves when the second end of the movable panel is moved downward to switch the opening portion from the tilt-open condition to the closed condition; and a pair of second engaging members provided on the movable panel for movement along the second elongated grooves of the stopper blocks, with slidable movement of the front shoes being restricted by virtue of the second engaging members being located in the second elongated grooves when the second end of the movable panel is moved upward to switch the opening portion from the closed condition to the tilt-open condition.

2. The tilt and slide roof device as defined in claim 1, wherein the second elongated grooves are positioned closer to the first end of the movable panel than the first elongated grooves.

3. The tilt and slide roof device as defined in claim 1, wherein the stopper blocks are elongated elements extending in a lengthwise direction of the rails and fixed on vertical walls of the guide rails.

4. The tilt and slide roof device as defined in claim 2, wherein the first engaging members are pins each positioned at a lower portion of one of the first elongated grooves when the opening portion is in the closed condition, and the second engaging members are pins each positioned at an upper portion of one of the second elongated grooves when the opening portion is under the tilt-open condition.

5. The tilt and slide roof device as defined in claim 3, wherein the stopper blocks alternatively restrict and permit sliding movement of the front shoes in response to tilt-down and tilt-up movement of the movable panel.

6. The tilt and slide roof device as defined in claim 1, wherein each of the driving links includes a rear lift link, a front lift link, and a movable bracket link.

7. The tilt and slide roof device as defined in claim 6, wherein one end of each rear lift link is rotatably supported by one of the rear shoes with a pin and an opposite end of each rear lift link is positioned between a pair of cam grooves formed at a rear end of one of the movable bracket links.

8. The tilt and slide roof device as defined in claim 7, wherein one end of each front lift link is positioned in a lower guide groove at a front side of a guide piece fixed to one of the guide rails, and an opposite end of each front lift link is slidably supported by a pin at a front end of one of the movable bracket links.

9. The tilt and slide roof device as defined in claim 6, wherein each guide rail is provided with upper and lower guide grooves connected to each other at a middle part of the guide rail for guiding an end portion of one of the front lift links to tilt down a front end portion of the movable panel into a horizontal position.

10. A tilt and slide sun roof device for a vehicle comprising:
a vehicle roof panel;
an opening portion formed in the roof panel;
a pair of guide rails arranged along peripheral sides of the opening portion;
a movable panel for opening and closing the opening portion;
a pair of slidably movable front shoes each guided in one of the guide rails and supporting a first end of the movable panel;
a pair of slidably movable rear shoes each guided in one of the guide rails and supporting a second end of the movable panel that is opposite the first end of the movable panel;
a pair of driving lift links each connected to the movable panel and the front and rear shoes to move the second end of the movable panel up and down centering around the first end of the movable panel, the opening portion being switched from a closed condition to a tilt-open condition by upward movement of the second end of the movable panel, and being switched from the closed condition to a slide open condition by downward movement of the second end of the movable panel;
a pair of stopper blocks;
a pair of grooves each provided at one of the stopper blocks, with one of the grooves being positioned closer to one longitudinal end of the opening portion than the other groove, the grooves extending in an up and down movement direction of the movable panel;
a pair of engaging members each movable along a respective one of the grooves, with slidable movement of the front shoes being restricted by virtue of one of the engaging members being located in the respective groove when the second end of the movable panel is moved downward to switch the movable panel from the tilt-open condition to the closed condition.

11. The tilt and slide sun roof device as defined in claim 10, wherein each of the stopper blocks is mounted on one of the guide rails.

12. The tilt and slide sun roof device as defined in claim 10, wherein each of the engaging members is mounted on one of the driving lift links.

13. The tilt and slide sun roof device as defined in claim 10, wherein the pair of stopper blocks includes first and second stopper blocks, the grooves being provided at the first stopper block, and including a pair of grooves provided at the second stopper block, the pair of engaging members forming a first pair of engaging members, and including a second pair of engaging members each positioned in one of the grooves of the second stopper block.

14. The tilt and slide sun roof device as defined in claim 10, wherein the engaging members possess a width, and each of the grooves possesses a width-wise dimension at one end of the groove that is approximately the same as the width of one of the engaging members.

15. The tilt and slide roof device as defined in claim 10, wherein the engaging members are each positioned at a lower portion of the respective groove when the opening portion is in the closed condition.

16. A tilt and slide sun roof device for a vehicle comprising:
a vehicle roof panel;
an opening portion formed in the roof panel;
a pair of guide rails arranged along peripheral sides of the opening portion;

a movable panel for opening and closing the opening portion;

a pair of slidably movable front shoes each guided in one of the guide rails and supporting a first end of the movable panel;

a pair of slidably movable rear shoes each guided in one of the guide rails and supporting a second end of the movable panel that is opposite the first end of the movable panel;

a pair of driving lift links each connected to the movable panel and the front and rear shoes to move the second end of the movable panel up and down centering around the first end of the movable panel, the opening portion being switched from a closed condition to a tilt-open condition by upward movement of the second end of the movable panel, and being switched from the closed condition to a slide open condition by downward movement of the second end of the movable panel;

a pair of stopper blocks;

a pair of grooves each provided at one of the stopper blocks, with one of the grooves being positioned closer to one longitudinal end of the opening portion than the other groove, the grooves extending in an up and down movement direction of the movable panel;

a pair of engaging members each movable along a respective one of the grooves, with slidable movement of the front shoes being restricted by virtue of one of the engaging members being located in the respective groove when the second end of the movable panel is moved upward to switch the movable panel from the closed condition to the tilt-open condition.

17. The tilt and slide sun roof device as defined in claim 16, wherein each of the stopper blocks is mounted on one of the guide rails.

18. The tilt and slide sun roof device as defined in claim 16, wherein each of the engaging members is mounted on one of the driving lift links.

19. The tilt and slide sun roof device as defined in claim 16, wherein the engaging members possess a width, and each of the grooves possesses a width-wise dimension at one end of the groove that is approximately the same as the width of one of the engaging members.

20. The tilt and slide roof device as defined in claim 10, wherein the engaging members are each positioned at an upper portion of the respective groove when the opening portion is under the tilt-open condition.

* * * * *